United States Patent [19]

Nagata et al.

[11] Patent Number: 5,022,141

[45] Date of Patent: Jun. 11, 1991

[54] METHOD FOR MANUFACTURING MULTITURN THIN FILM COIL

[75] Inventors: Yuji Nagata, Yao; Toshio Fukazawa, Kyoto; Kumiko Wada, Kawanishi; Yoshihiro Tosaki, Ibaraki, all of Japan

[73] Assignee: Matsushita Electric Industrial Co., Ltd., Osaka, Japan

[21] Appl. No.: 539,738

[22] Filed: Jun. 18, 1990

[30] Foreign Application Priority Data

Jun. 16, 1989 [JP] Japan .................................. 1-155350
Jul. 3, 1989 [JP] Japan .................................. 1-172236

[51] Int. Cl.$^5$ .............................................. G11B 5/42
[52] U.S. Cl. ....................................... 29/603; 360/123; 360/124
[58] Field of Search ..................... 29/603; 336/200; 360/123, 124

[56] References Cited

U.S. PATENT DOCUMENTS 4,839,197 6/1989 Henderson ..................... 29/603 X
4,861,398 8/1989 Fukuoka et al. ................. 29/603 X Primary Examiner—Carl E. Hall
Attorney, Agent, or Firm—Wenderoth, Lind & Ponack

[57] ABSTRACT

A method of manufacturing a multiturn coil and a thin film magnetic head including a multiturn coil.

This multiturn coil manufacturing method includes the following steps. First a laminate made up of conducting layers and insulating layers for coil is formed on a base member on a substrate and having a given inclination. Then this laminate is formed into a loop shape with a space or discontinuity thereon. In the next step, the upper part of the laminate on opposite sides of the space is removed to form a flat surface parallel to the substrate in which the ends of all the conducting layers are exposed. Finally, film conductive strips are connected between these exposed portions across the discontinuity to complete a multiturn coil.

8 Claims, 9 Drawing Sheets

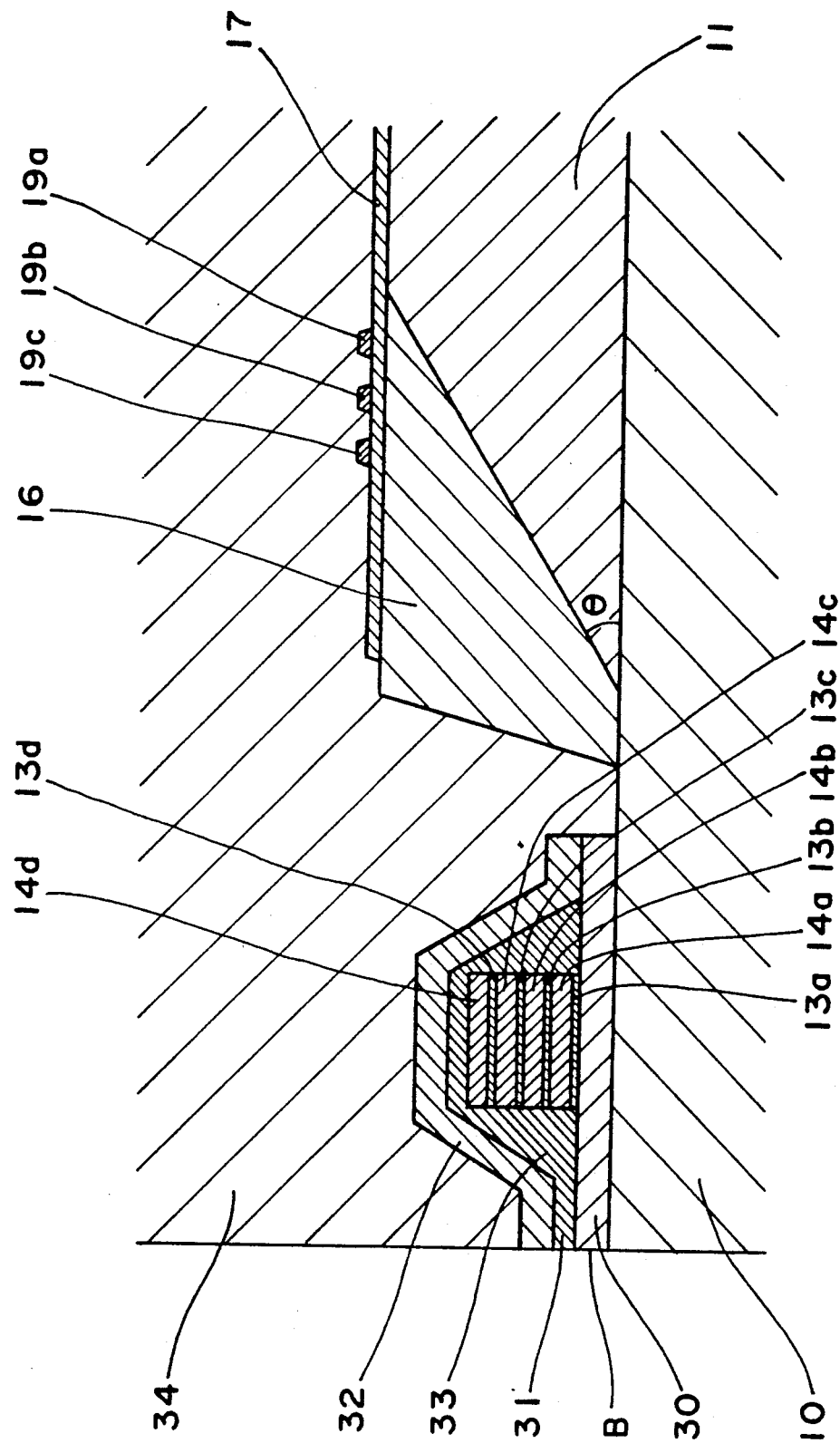

Fig. 3 III

Fig. 3VII

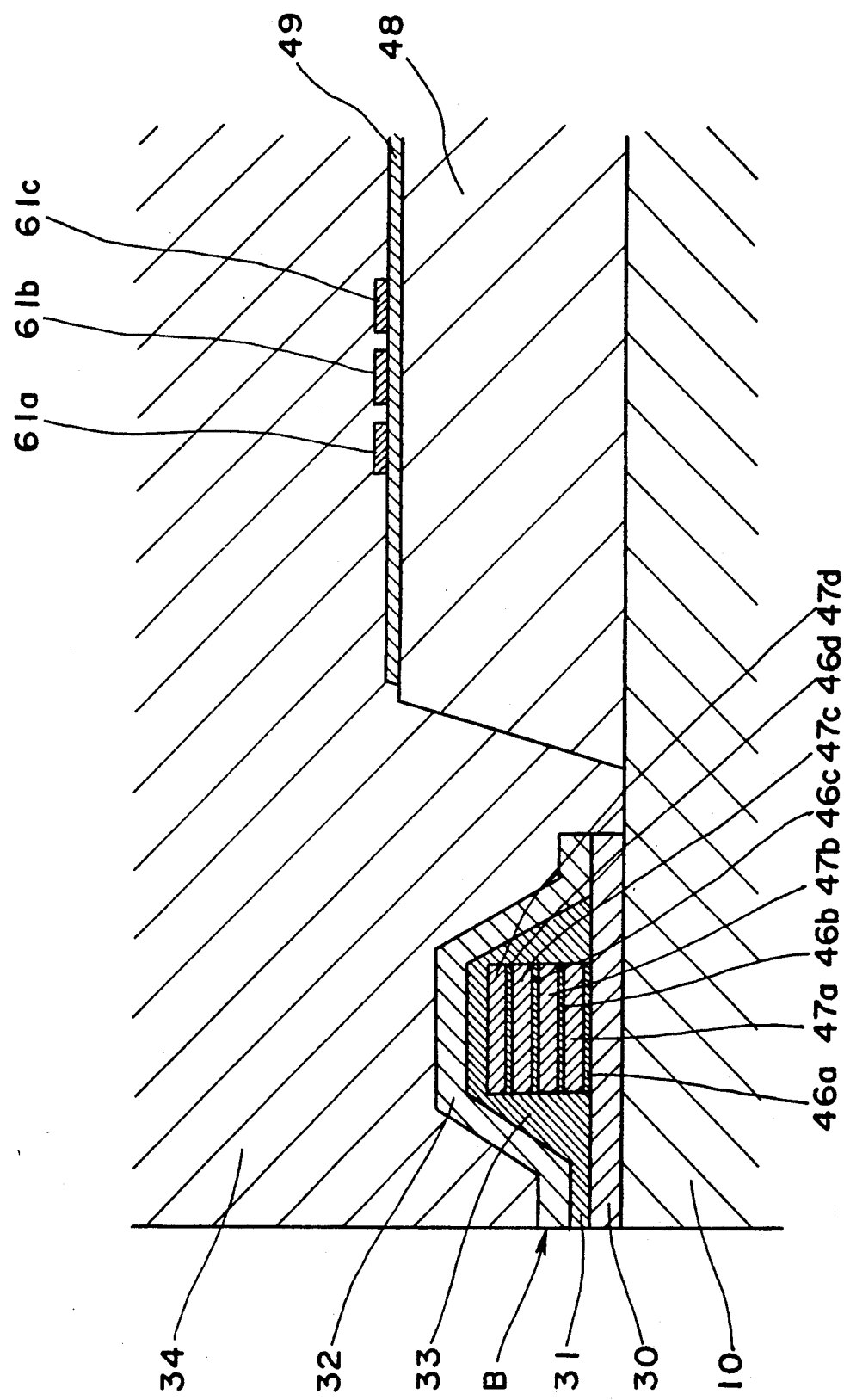

Fig. 5 III

Fig. 5VII

Fig. 5VIII

METHOD FOR MANUFACTURING MULTITURN THIN FILM COIL

BACKGROUND OF THE INVENTION

1. Field of the Invention

The present invention relates to a method for manufacturing a multiturn thin film coil preferably for use as a thin film magnetic head such as a tape drive or the like.

2. Description of the Prior Art

There are three known types of construction of a multiturn thin film coil usable as a component of a thin film magnetic head, namely a spiral coil 51 as shown in FIG. 1A, a zigzag coil 52 as shown in FIG. 1B and a helical coil 53 as shown in FIG. 1C, and these are already disclosed in published literature (IEEE Transactions on Magnetics, Vol. MAG-9 No. 3, page 317). FIG. 1A shows a thin film nagnetic head which includes a magnetic core comprising upper and lower magnetic parts 32 and 30 with a magnetic gap 31 therebetween and a spiral coil 51 arranged on a substrate 10. As shown in the figure, the coil 51 on the substrate 10 has its coil pattern planar and expanded in X and Y directions, thus occupying a large area, and hence it is difficult to arrange a plurality of magnetic heads on one substrate 10 at a high density and in parallel in the X direction, thus resulting in difficulty in manufacturing a high density multichannel head. Also, the magnetic core is required to be dimensioned larger in the Y direction with a resultant increase of the magnetic path length, this, in turn, resulting in an increased loss of signal fluxes and interfering with the effect of the multiturn coil.

The zigzag coil 52 of FIG. 1B with its smaller dimension in the X direction permits manufacture of a high-density multichannel head, but also has a defect of increased loss of the signal fluxes due to the increase of the magnetic path length of the magnetic core similar to the case of the aforementioned spiral coil.

As a method for eliminating the aforementioned defects, it has been proposed to use a helical coil 53 shown in FIG. 1C. A conventional method for manufacturing such a helical coil comprises the steps of forming a coil conducting film 55, forming an insulating layer 56, forming a through hole 57 in a coil conducting film 55 and insulating layer 56 and forming a conducting layer for connecting the adjacent coil conducting layer 55 to the through hole 57 layer after layer and to finally complete the multiturn film coil after repetition of these steps. Hence, this type of multiturn film coil is complicated to manufacture.

It is therefore an object of the present invention to provide a method for manufacturing a thin film multiturn coil which has the possibility of decreasing the dimensions of the space occupied thereby on the substrate as well as reducing the magnetic path length of a magnetic core and which is also simple and easy to manufacture.

SUMMARY OF THE INVENTION

In accomplishing this object according to the present invention, there is provided an improved method of manufacturing a thin film multiturn coil comprising the steps of forming a base structure having a substrate and a base member formed in a given area on a top surface of the substrate, the top surface of the base member having a substantially predetermined gradient relative to the top surface of the substrate; forming a loop-shaped laminate on the substrate and the base member, the laminate comprising a plurality of conducting coil layers and insulating coil layers laminated alternately, with a space or discontinuity with the layers of the laminate on the base member having substantially the same gradient as the base member relative to the substrate; removing the upper portion of the laminate on opposite sides of the discontinuity to form a surface at which the end face of each conducting layer and each insulating layer is exposed; and mounting electrically conductive members between the exposed end faces of the individual conducting layers in the parts of the loop-shaped laminate on opposite sides of the discontinuity to complete a multiturn coil.

According to the above-described manufacturing method of the present invention, the laminate made up of a plurality of conducting layers and insulating layers is made into a loop-shaped coil with a space or discontinuity by, for instance, a photolithographic method. Then by removing the upper parts of the ends of the loop-shaped laminate on opposite sides of the discontinuity, end faces of the constituent conducting layers are exposed, and a multiturn coil is completed by bridging the discontinuity with conductive members to connect corresponding pairs of exposed end faces.

Hence, unlike in the prior art, the photolithographic working layer by layer can be dispensed with. As a result, according to the method of the present invention for manufacturing a multiturn coil for a film magnetic head or the like, a thin film magnetic head with a high track density and high efficiency can be manufactured economically with a high yield.

BRIEF DESCRIPTION OF THE DRAWINGS

These and other objects and features of the present invention will become apparent from the following description taken in conjunction with the accompanying drawings, in which:

FIGS. 2 and 2A are a simplified perspective view showing the external appearance of a thin film magnetic head manufactured by a method including the manufacturing method for a four-turn coil described as a first embodiment of the present invention, and a sectional view of a magnetic head in complete form, respectively;

FIGS. 4 and 4A are a simplified perspective view showing the external appearance of the thin film magnetic head manufactured by a method including the manufacturing method for a four-turn coil described as a second embodiment of the present and a seectional view of the magnetic head in complete form, respectively.

DETAILED DESCRIPTION OF THE INVENTION

First Embodiment

Figure 1A:
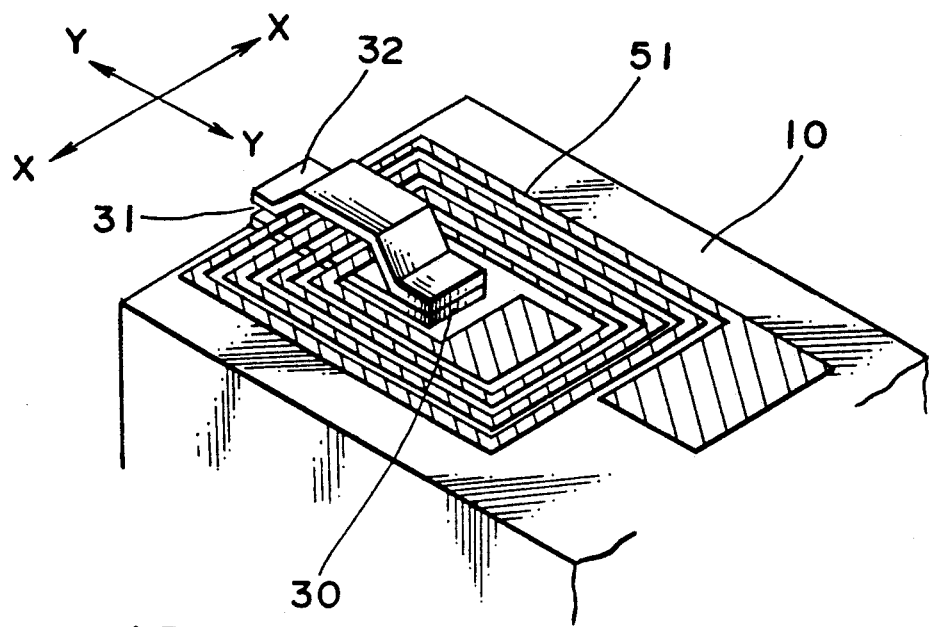
FIGS. 1A, 1B and 1C are perspective views showing thin film magnetic heads having a spiral coil, a zigzag coil and a helical coil, respectively, as described above.
Figure 1B:
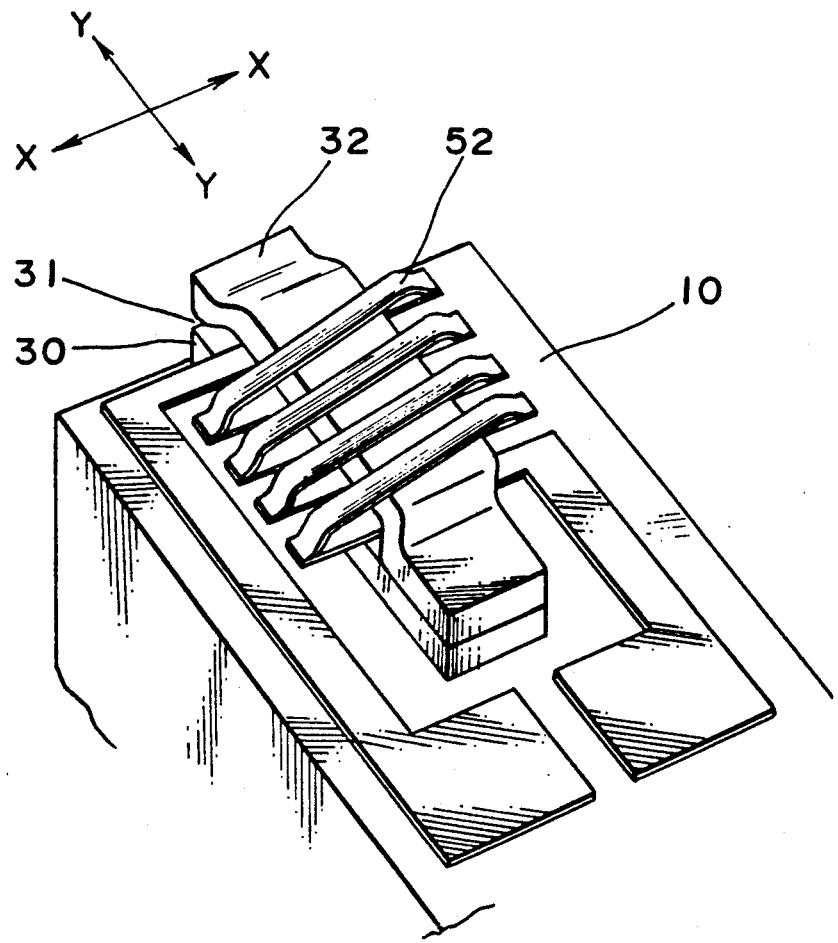
Figure 1C:
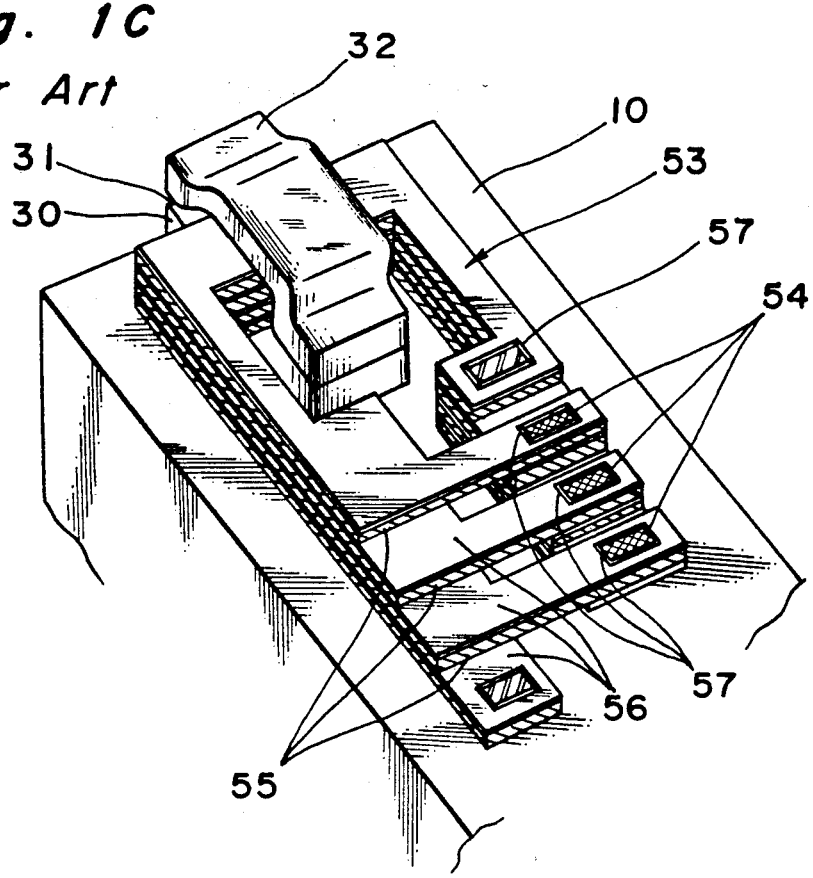
Figure 2:
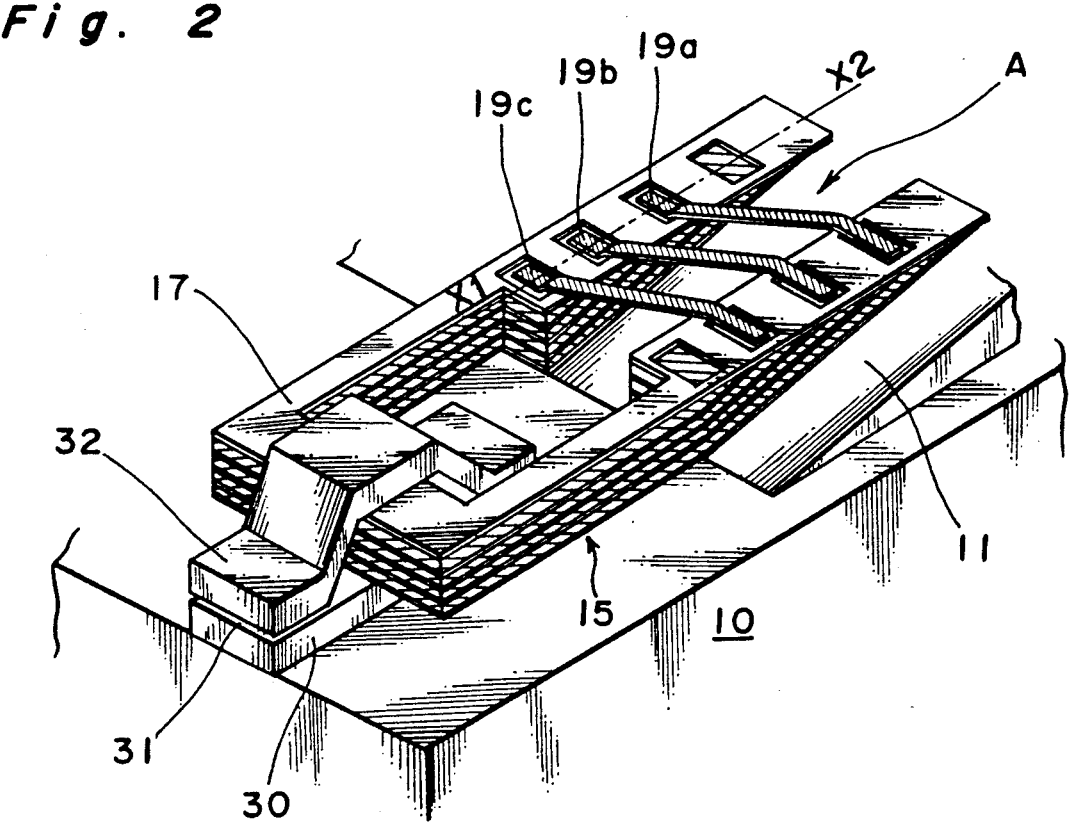
Figure 3:
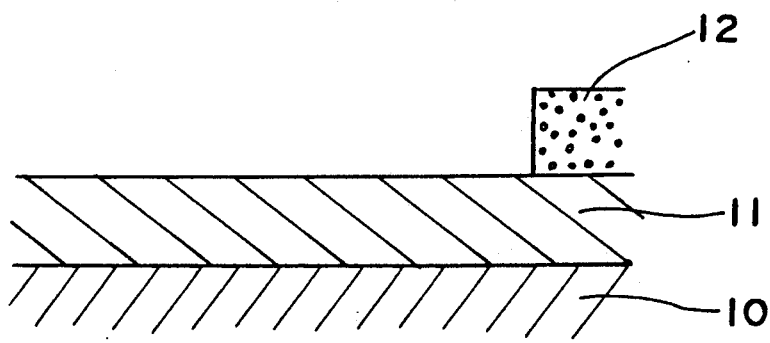
FIGS. 3I–3VII are illustratory views showing the successive individual steps of the method for manufacturing the thin film magnetic head shown in FIGS. 2 and 2A.
Figure 3:
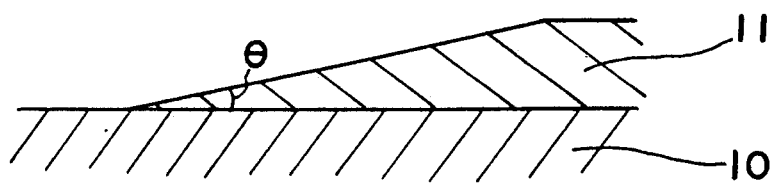
Figure 3:
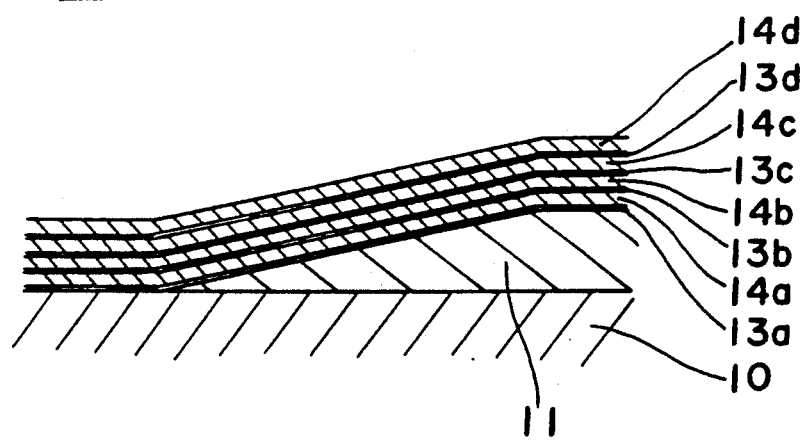
Figure 3:
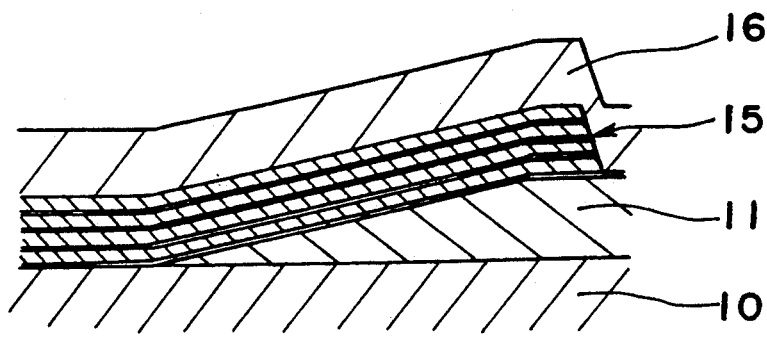
Figure 3V:
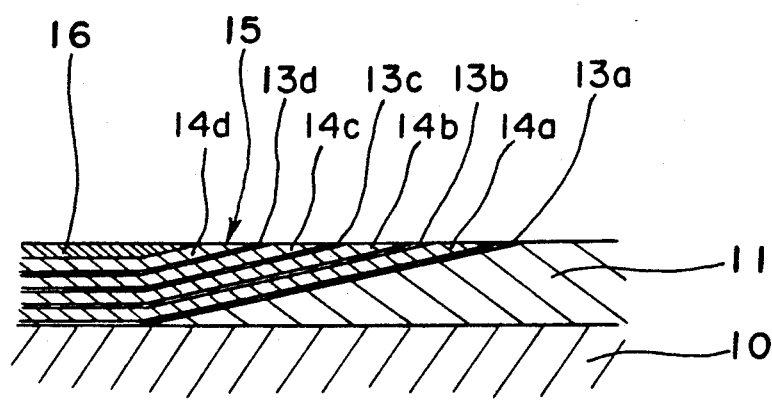
Figure 3V:
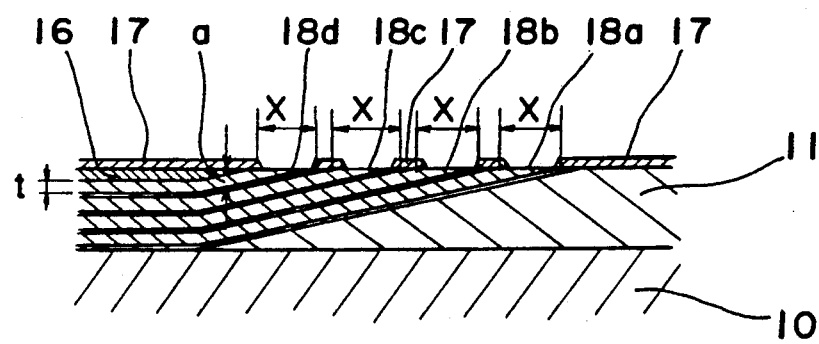
Figure 3V:
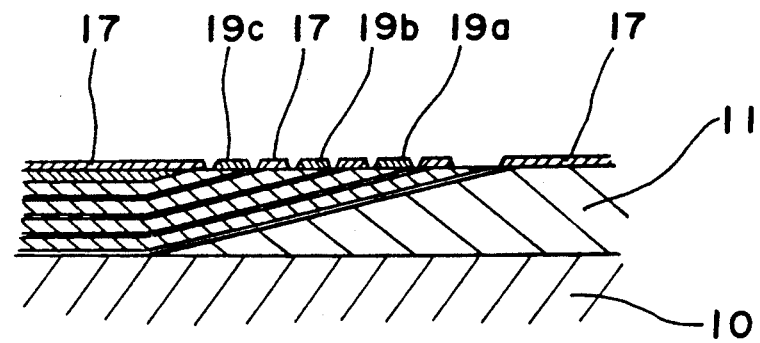

FIGS. 2 and 2A are a perspective view and a sectional view, respectively, of a four-turn coil thin film magnetic head manufactured by a method including the method for manufacturing a multiturn coil described as a preferred embodiment of the present invention. It is to be noted that, as seen from a comparison of FIG. 2 with FIG. 2A, FIG. 2 is a simplified view with an insulating layer 16, magnetic gap layer 31 and protective layer 34, as shown in FIG. 2A, omitted. FIGS. 3I-3VII are sectional views taken along the line X1-X2 in FIG. 2, respectively, showing the steps of the method according to the first embodiment of the present invention.

Referring mainly to FIGS. 3I-3VII, the steps of the manufacturing method according to this embodiment will hereinafter be described successively.

First, a lower magnetic part 30 is formed on a substrate 10 of glass, ceramic or the like by sputtering and photolithography (see FIG. 2).

Then, as shown in FIG. 3I, a flat insulating base layer 11a of $SiO_2$ is formed on base 10 by spattering and then a masking photo-resist layer 12 is formed thereon. Then, as shown in FIG. 3II, an insulating base member 11 is formed by a well-known ion beam etching method or the like with the upper surface sloped at an angle of Θ. This angle Θ is preferred to be not more than 45°. The reason therefor will be stated later. Thus, a base structure is formed comprising the sloped insulating base member 11 on the substrate 10.

In the next step, as shown in FIG. 3III, insulating layers 13a, 13b, 13c, 13d and conducting layers 14a, 14b, 14c, 14d of Cu, Al or the like are alternately laminated on the substrate 10 and the base member 11 by vapor deposition or spattering to form a four-layer laminate 15. Then, the laminate 15 is treated by photolithography to form a loop-shaped laminated member with a space or discontinuity A in the loop shape on the upper surface of the base member 11, as shown in FIG. 2. As seen from FIG. 3IV, the top surface of the laminate 15 and the portion thereof lying on the base member 11, each have a gradient substantially the same as that of the upper surface of the base layer 11.

Thereafter, as shown in FIG. 3IV, an insulating layer 16 is formed on the loop-shaped laminate which is thicker than the insulating base layer 11a. The recess inside the loop-shaped laminate 15 and the discontinuity A are also filed with the insulating layer 16 (see FIG. 2A).

In the next step, as shown in FIG. 3V, the ends of the insulating layer 16 and the layers of the laminate 15 which are above the upper surface of the base member 11 are removed by the etch back method (a known flattening technique) utilizing an ion beam etching method or the like or a mechanical grinding method to a flat plane parallel to substrate 10 until an end face of the insulating layer and an end face of each conducting layer 14a, 14b, 14c, 14d is exposed and the end faces are substantially parallel to the substrate 10.

Then, as seen from FIG. 3VI, another insulating layer 17 is formed on the flat parallel end faces of laminate 15 and insulating layer 16 and on base member 11, and then the insulating layer 17 is partly removed by etching so that connecting terminal parts 18a-18d are exposed at the flat ends of conductive layers 14a-14d.

In the following step, as shown in FIG. 3VII and FIGS. 2 and 2A, film conductive strips of Cu, Al or the like 19a, 19b, 19c are formed by spattering and photolithography to link the corresponding pairs of the exposed end faces of the individual conducting layers exposed in the ends of the loop-shaped laminated member on opposite sides of the discontinuity A to form the conducting layers 14a-14d into a four-turn helical coil. The individual film conductive strips 19a-19c are supported by the insulating layer 16 in the discontinuity between the ends of the loop-shaped laminated member. Alternatively, the conducting layers 14a-14d may be connected by bonding wires therebetween instead of the film conductive strips 19a-19c.

Although, as described above, the gradient of the sloped base layer is set at not more than 45°, it is possible to form connecting terminal portions X with a length greater than the thickness of the individual conducting layers 14a-14d which is not less than "t". When the individual conducting layers and insulating layers constituting the laminate 15 are formed by spattering, vapor deposition or plating, the same mass of material is deposited per unit surface area parallel to the top surface of the substrate 10. This means that the film thickness "a" in the sloped section of the conducting layer is equal to the thickness "t". Hence, the length X of the connecting terminal portion is represented by the following formula:

$$X = a/\tan\theta$$
$$= t/\tan\theta$$

hence, when Θ=45°, X≧t and this means facilitation of connection of the film conductive strips 19a-19c with the connection terminal portions.

In the next step, the peripheral part of insulating layer 16 formed on the magnetic base layer 30 is removed and after forming a magnetic gap layer 31 for formation of a magnetic gap using $SiO_2$ film as the material thereof by spattering and photolithography, a magnetic upper layer 32 is formed on the aforementioned gap layer 31 and then a protective layer 34 is formed to cover the entire structure on the substrate 10.

Then, finally, the contact surface B of the head, against which a magnetic medium will advance across the head so as to be acted on by the head, is finished by grinding to complete a thin film magnetic head.

Second Embodiment

Figure 4:
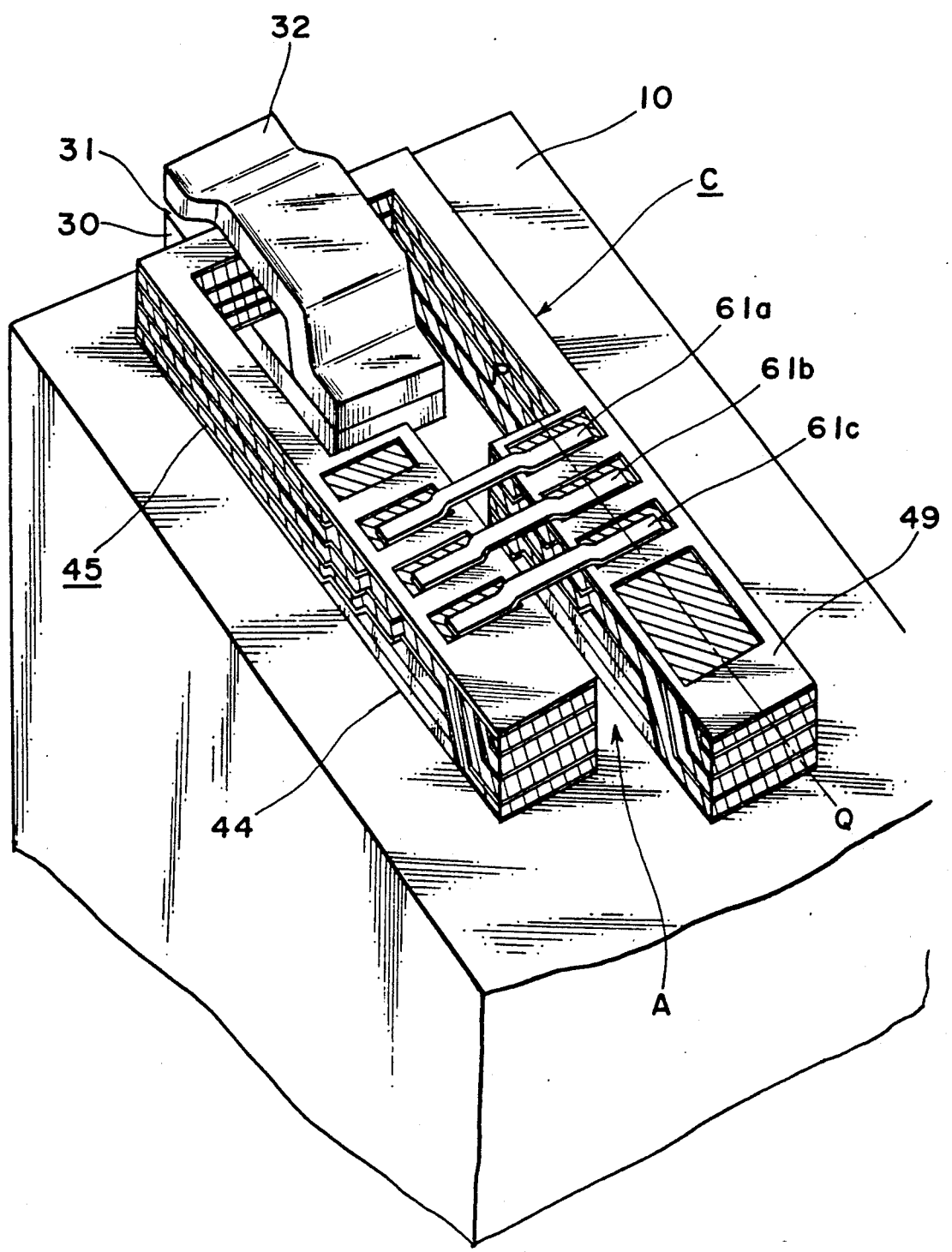
Figure 5:
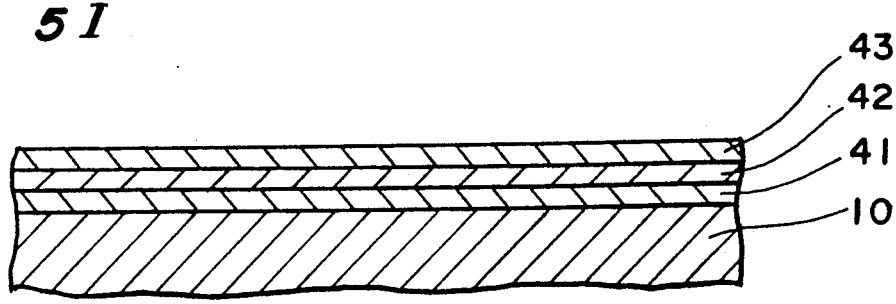
FIGS. 5I–5VIII are illustratory views showing the successive individual steps of the method for manufacturing the thin film magnetic head according to the second embodiment of the invention.
Figure 5:
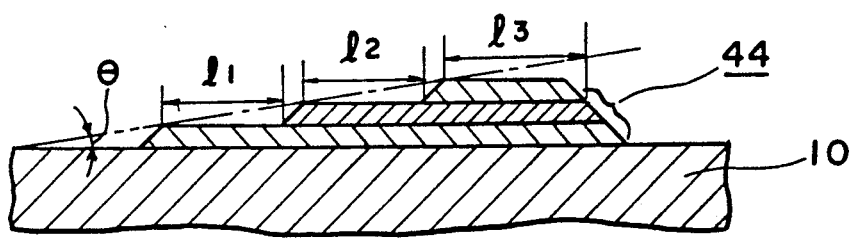
Figure 5:
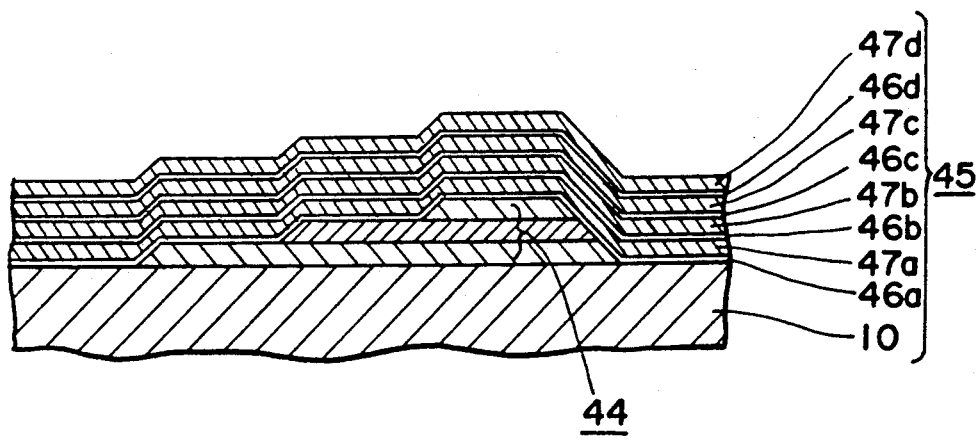
Figure 5:
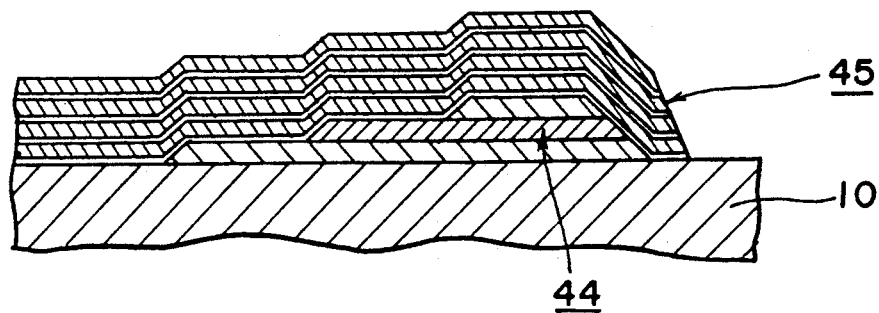
Figure 5V:
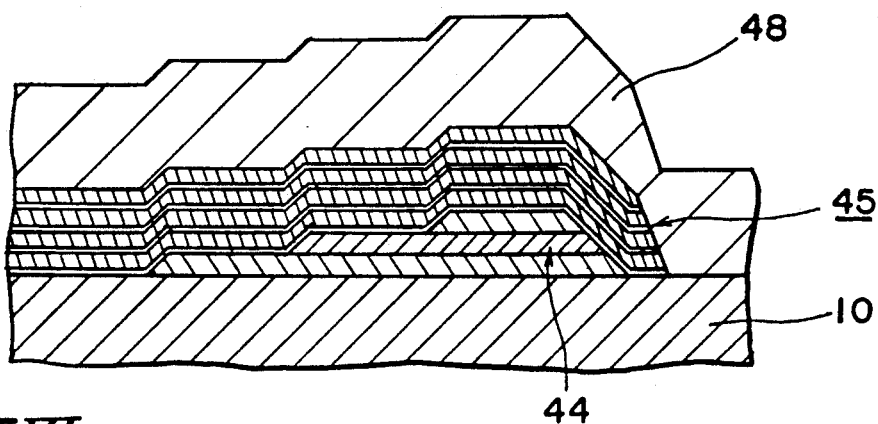
Figure 5V:
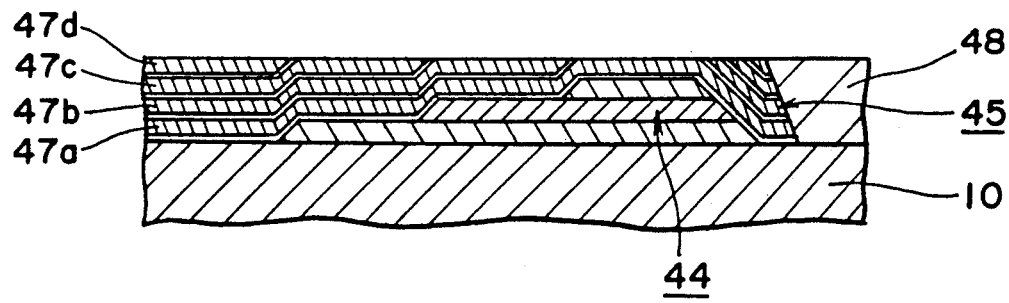
Figure 5V:
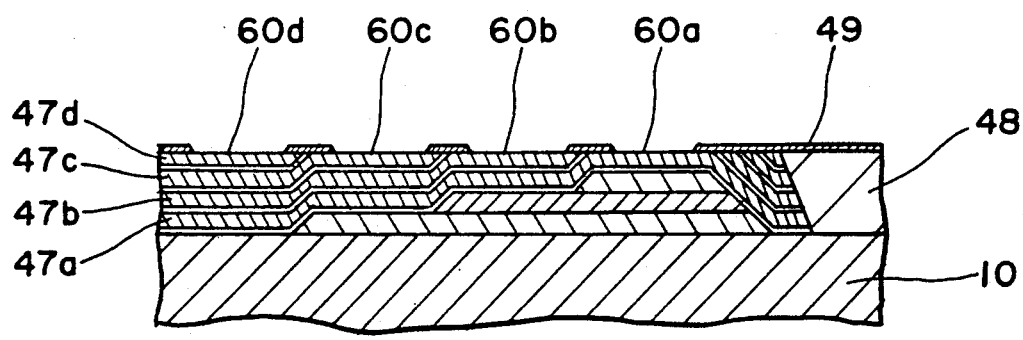
Figure 5V:
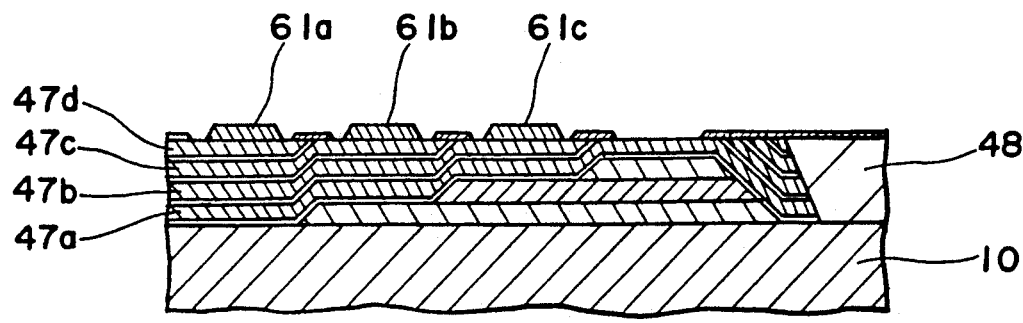

FIGS. 4, 4A and 5I-5VIII show the second embodiment of the present invention. FIGS. 4 and 4A show an external perspective view and a sectional view, respectively, of a four-turn thin film magnetic head manufactured by a method according to the second embodiment of the invention including the method for manufacturing a multiturn coil. As in the first embodiment described above, FIG. 4 is a simplified view, while FIG. 4A is a sectional view of a complete film magnetic head. FIGS. 5I-5VIII are sectional views taken along the line P-Q in FIG. 3, showing the method for manufacturing a film coil according to the second embodiment of the invention.

The steps comprising the manufacturing method of the second embodiment of the invention will be described below successively with reference being made mainly to FIGS. 5I-5VIII.

First, the magnetic lower layer 30 is formed on the substrate 10 of glass, ceramic or the like (see FIG. 4).

Then, a copper layer 41, an SiO₂ layer and another copper layer 43 are formed successively on substrate 10 as shown in FIG. 5I.

As shown in FIG. 5II, these layers are partially removed by photolithography to form a stepped base member 44 having steps with a gradient of Θ. Thus a base structure comprising the base member 44 and the substrate 10 is formed.

In the next step, as shown in FIG. 5III, insulating layers 46a–46d and conducting layers 47a–47d of Cu, Al or the like are alternately laminated on the substrate 10 and base member 44 by vapor deposition or spattering to form a four-layer laminate 45.

In the step shown in FIG. 5IV the aforementioned laminate 45 is treated by photolithography to form a loop-shaped laminated member 15 with a space or discontinuity A as shown in FIG. 4.

As shown in FIG. 5V, an insulating layer 48 is formed with a thickness not less than that of the insulating base member 44. The recess inside the loop-shaped laminated member 45 is filled with the insulating layer 48 (see FIG. 4A).

Then, as shown in FIG. VI, the upper part of thus built up laminated member is removed by the etch back method utilizing an ion beam etching technique or by machanical grinding to a flat plane parallel to substrate 10 until the end faces of the insulating layers 48 as well as conducting layers 47a–47d comprising the laminate 45 are exposed at the flat parts of the conductive layers over the steps of base member 44.

In the next step, as shown in FIG. 5VII, an insulating layer 49 is formed on the thus treated laminated member 45 and base member 11 and then the connection terminal portions 60a–60d of conducting layers 47a–47d are exposed by removing the insulating layer 17 by spot etching.

Thereafter, as shown in FIG. 5VIII, film conductive strips 61a–61c are formed between the exposed portions of the individual conducting layers on opposite sides of the space A and the conducting layers 47a–47d are thereby connected into a four-turn helical coil. By making the lengths $l_1$, $l_2$, $l_3$ of the exposed steps of the individual insulating layers 41–43 larger than the respective layer thicknesses of the conducting layers, connection terminal portions whose lengths are not less than the thicknesses of the individual conducting layers 47a–47d can be formed, thus facilitating connecting the film conductive strips 61a–61c in the later step.

Then the edge portion of an insulating layer 48 formed on the magnetic base layer 30 is removed to permit formation of the magnetic gap layer 31 by means of an SiO₂ film for providing a magnetic gap and, thereafter, the magnetic top layer 32 is formed on the aforementioned gap layer 31 and the protective layer 34 is formed to cover the whole structure on the substrate 10.

Finally, the contact face B of the head against which a magnetic medium is to run is finished by grinding or the like and the then film magnetic head is thus completed.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

We claim:

1. A method for manufacturing a thin film multiturn coil comprising the steps of:

forming a base structure having a substrate and a base member in a given area on the upper surface of said substrate, the upper side of said base member having a substantially predetermined gradient relative to the upper surface of said substrate;

forming a loop-shaped laminate on said substrate and said base member, said laminated having a plurality of conducting layers and insulating layers laminated alternately, and having a discontinuity at said base member, the part of said said laminate on said base member having the layers thereof at substantially the same gradient as the gradient of said base member relative to said substrate;

removing the upper portion of end sections of said loop-shaped laminate on opposite sides of said discontinuity at said base member so as to expose end faces of each conducting layer and each insulating layer; and mounting electrically conductive members between the exposed end faces of individual conducting layers on opposite sides of said discontinuity to form said conducting layers into a multiturn coil.

2. A method as claimed in claim 1 in which said removing step for removing the upper portion of the end sections of said loop shaped laminate on opposite sides of said discontinuity is carried out to form a surface substantially parallel to the upper surface of said substrate.

3. A method as claimed in claim 2 further comprising, before said removing step, the step of forming an insulating layer filling the inside of the loop said loop-shaped laminate and the discontinuity and thick enough to protrude above the upper surface of said laminate and covering the upper surface of said laminate, and wherein in said removing step, the upper part of said insulating layer is removed together with the upper portion of the end sections of said loop-shaped laminate so as to have the upper surface of said insulating layer parallel to the upper surface of said substrate, whereby said conductive members are supported by said insulating layer in said discontinuity between the end sections of said loop-shaped laminate.

4. A method as claimed in claim 1 in which said multiturn coil is for use in a film magnetic head.

5. A method as claimed in claim 1 in which said upper surface of said base member is an inclined plane.

6. A method as claimed in claim 1 in which the angle of inclination of said inclined plane is no more than 45 degrees.

7. A method as claimed in claim 1 in which the upper side of said base member is stepped.

8. A method as claimed in claim 7 in which the lengths of the stepped portions of said base member are no smaller than the thicknesses of the respective conducting layers of said laminate.

* * * * *